United States Patent
Chang (10) Patent No.: US 9,457,672 B2
(45) Date of Patent: Oct. 4, 2016

(54) CHARGING APPARATUS WITH DYNAMICAL CHARGING POWER AND METHOD OF OPERATING THE SAME

(71) Applicant: DELTA ELECTRONICS, INC., Taoyuan County (TW)

(72) Inventor: Yu-Ming Chang, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 182 days.

(21) Appl. No.: 14/448,289

(22) Filed: Jul. 31, 2014

(65) Prior Publication Data
US 2015/0202973 A1 Jul. 23, 2015

(30) Foreign Application Priority Data
Jan. 21, 2014 (TW) ............................. 103102052 A (51) Int. Cl.
*H02J 7/00* (2006.01)
*B60L 11/18* (2006.01)
(Continued)

(52) U.S. Cl.
CPC ......... *B60L 11/1811* (2013.01); *B60L 11/1825* (2013.01); *B60L 11/1844* (2013.01);
(Continued)

(58) Field of Classification Search
CPC . Y02T 10/7005; Y02T 90/14; Y02T 90/128; Y02T 10/7241; Y02T 90/127; Y02T 10/645; Y02T 10/70; Y02T 10/7216; Y02T 10/7258; Y02T 10/7283; Y02T 90/12; Y02T 90/34; Y02T 10/72; Y02T 10/725; Y02T 10/7275; Y02T 10/84; H02J 4/00; H02J 7/007; H02J 7/0027; H02J 7/045; H02J 3/32; H02J 3/382; H02J 3/383; H02J 7/0055; H02J 7/0068; H02J 7/02; B60L 2210/40; B60L 2210/30; B60L 11/1811; B60L 11/18; B60L 15/2045; B60L 2210/10; B60L 11/12; B60L 11/1801; B60L 11/1809; B60L 11/1844; B60L 2210/20
See application file for complete search history.

(56) References Cited

U.S. PATENT DOCUMENTS

| | | | | |
|---|---|---|---|---|
| 5,341,083 A | * | 8/1994 | Klontz | B60L 11/1816 320/109 |
| 5,506,484 A | * | 4/1996 | Munro | B60L 3/0069 318/139 |

(Continued)

FOREIGN PATENT DOCUMENTS

| | | |
|---|---|---|
| CN | 102005803 | 4/2011 |
| EP | 2388884 | 5/2011 |

(Continued)

OTHER PUBLICATIONS

Office Action dated Nov. 13, 2014 from corresponding No. TW 103102052.

(Continued)

*Primary Examiner* — Helen Rossoshek
(74) *Attorney, Agent, or Firm* — Hauptman Ham, LLP (57) ABSTRACT

A charging apparatus with dynamical charging power is configured to charge an electric vehicle. The charging apparatus includes a main power conversion unit, an auxiliary power conversion unit, and a control unit. The main power conversion unit receives an AC power and converts the AC power into a main output power. The auxiliary power conversion unit receives an auxiliary DC power and converts the auxiliary DC power into an auxiliary output power. The control unit controls maximum output power of the main output power to be an upper-limit output power value. When a charging power value of charging the electric vehicle is greater than the upper-limit output power value, the control unit dynamically controls the auxiliary output power according to a power difference value between the charging power value and the upper-limit output power value.

16 Claims, 7 Drawing Sheets

(51) Int. Cl.
*H02J 7/35* (2006.01)
*H02J 3/00* (2006.01)
*H02J 3/38* (2006.01)
*H02J 7/02* (2016.01)
*H02J 7/34* (2006.01)

(52) U.S. Cl.
CPC .............. *H02J 3/005* (2013.01); *H02J 3/382* (2013.01); *H02J 3/383* (2013.01); *H02J 7/007* (2013.01); *H02J 7/02* (2013.01); *H02J 7/34* (2013.01); *H02J 7/35* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | | | |
|---|---|---|---|---|
| 8,018,204 | B2* | 9/2011 | Bourilkov | H02J 7/0073 320/132 |
| 8,030,882 | B2* | 10/2011 | Ito | B60K 6/48 307/66 |
| 8,810,206 | B2* | 8/2014 | Ang | B60L 3/0069 320/104 |
| 8,849,471 | B2* | 9/2014 | Daniel | F03D 9/00 307/28 |
| 9,041,348 | B2* | 5/2015 | Murawaka | B60L 11/1816 320/104 |
| 2002/0071301 | A1* | 6/2002 | Kinghorn | H02M 3/33515 363/125 |
| 2002/0174797 | A1* | 11/2002 | Kumar | B60L 7/22 105/26.05 |
| 2003/0047209 | A1 | 3/2003 | Yanai et al. | |
| 2006/0005736 | A1* | 1/2006 | Kumar | B60L 11/1801 105/1.4 |
| 2006/0076171 | A1* | 4/2006 | Donnelly | B60L 7/04 180/65.225 |
| 2006/0276938 | A1 | 12/2006 | Miller | |
| 2008/0036427 | A1* | 2/2008 | Hiraki | B60L 9/005 320/166 |
| 2008/0067974 | A1* | 3/2008 | Zhang | H02J 7/022 320/104 |
| 2008/0218121 | A1* | 9/2008 | Gale | B60L 11/1824 320/109 |
| 2009/0145674 | A1* | 6/2009 | Lee | B60K 6/405 180/65.1 |
| 2010/0039062 | A1 | 2/2010 | Gu et al. | |
| 2010/0076615 | A1* | 3/2010 | Daniel | F03D 9/00 700/293 |
| 2010/0270860 | A1* | 10/2010 | Kamaga | B60K 6/445 307/10.7 |
| 2011/0006731 | A1* | 1/2011 | Wang | B60L 11/1816 320/109 |
| 2011/0101915 | A1* | 5/2011 | Mitsutani | B60K 6/445 320/109 |
| 2011/0227534 | A1* | 9/2011 | Mitsutani | B60K 6/445 320/109 |
| 2012/0074893 | A1* | 3/2012 | Cole | H02J 7/35 320/101 |
| 2012/0074903 | A1* | 3/2012 | Nakashima | B60L 11/1816 320/109 |
| 2012/0187759 | A1* | 7/2012 | Kamichi | B60L 3/003 307/10.1 |
| 2012/0187900 | A1* | 7/2012 | Murawaka | B60L 11/1816 320/106 |
| 2012/0229085 | A1* | 9/2012 | Lau | B60L 11/1818 320/109 |
| 2013/0057214 | A1* | 3/2013 | Stevens | B60L 11/1824 320/109 |
| 2013/0113413 | A1* | 5/2013 | Harty | H01M 10/465 320/101 |
| 2013/0134924 | A1* | 5/2013 | Kanakasabai | B60L 1/003 320/104 |
| 2013/0175990 | A1* | 7/2013 | Jung | B60L 11/126 320/109 |
| 2013/0193922 | A1* | 8/2013 | Park | H02J 7/02 320/109 |
| 2013/0241496 | A1* | 9/2013 | Kurayama | H02J 7/0031 320/134 |
| 2015/0061387 | A1* | 3/2015 | Daniel | F03D 9/00 307/24 |
| 2015/0202973 | A1* | 7/2015 | Chang | B60L 11/1844 320/101 |

FOREIGN PATENT DOCUMENTS

| | | |
|---|---|---|
| JP | 2001-298864 | 10/2001 |
| JP | 2013-38966 | 2/2013 |
| TW | M425452 | 3/2012 |
| WO | 2008125696 | 10/2008 |
| WO | 2013017443 | 2/2013 |

OTHER PUBLICATIONS

Office Action dated Jun. 23, 2015 from corresponding No. JP 2014-156911.
The extended European search report dated Aug. 7, 2015 from corresponding No. EP 14179733.2.

* cited by examiner

CHARGING APPARATUS WITH DYNAMICAL CHARGING POWER AND METHOD OF OPERATING THE SAME

BACKGROUND

1. Technical Field

The present disclosure relates generally to a charging apparatus with dynamical charging power and a method of operating the same, and more particularly to a charging apparatus with dynamical charging power applied to an electric vehicle and a method of operating the same.

2. Description of Related Art

In recent years, the technology developments of electric vehicles and charging stations have received much attention because of high oil prices and extensions of environmental protection by governmental and non-governmental organizations. In order to reduce that the charging apparatus is excessively dependent on the AC electric grid, however, the current regulations specify the maximum output power of the AC electric grid for the charging apparatus. In addition, the output power generated from only the AC electric grids for the charging stations cannot provide high charging demands and charging qualities because of the limited output power generated from electric grids in remote areas or the evaluation of demand charges by the industries of charging stations.

Accordingly, it is desirable to provide a charging apparatus with dynamical charging power and a method of operating the same to reduce that the charging station is excessively dependent on the AC electric grid, increase demands of environmental protection and energy saving, and ensure that the charging station stably and accurately charges the electric vehicle during the charging operation.

SUMMARY

An object of the present disclosure is to provide a charging apparatus with dynamical charging power configured to charge an electric vehicle to solve the above-mentioned problems. Accordingly, the charging apparatus includes a main power conversion unit, an auxiliary power conversion unit, and a control unit. The main power conversion unit receives an AC power and converts the AC power into a main output power. The auxiliary power conversion unit receives an auxiliary DC power and converts the auxiliary DC power into an auxiliary output power. The control unit controls maximum output power of the main output power to be an upper-limit output power value. The control unit dynamically controls the auxiliary output power according to a power difference value between a charging power value and the upper-limit output power value when the charging power value of charging the electric vehicle is greater than the upper-limit output power value.

Another object of the present disclosure is to provide a method of operating a charging apparatus with dynamical charging power configured to charge an electric vehicle to solve the above-mentioned problems. Accordingly, the method includes following steps: (a) providing a main power conversion unit configured to receive an AC power and convert the AC power into a main output power; (b) providing an auxiliary power conversion unit configured to receive an auxiliary DC power and convert the auxiliary DC power into an auxiliary output power; (c) providing a control unit configured to control maximum output power of the main output power to be an upper-limit output power value; and (d) dynamically controlling the auxiliary output power according to a power difference value between a charging power value and the upper-limit output power value when the charging power value of charging the electric vehicle is greater than the upper-limit output power value.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Reference will now be made to the drawing figures to describe the present invention in detail.

Figure 1:
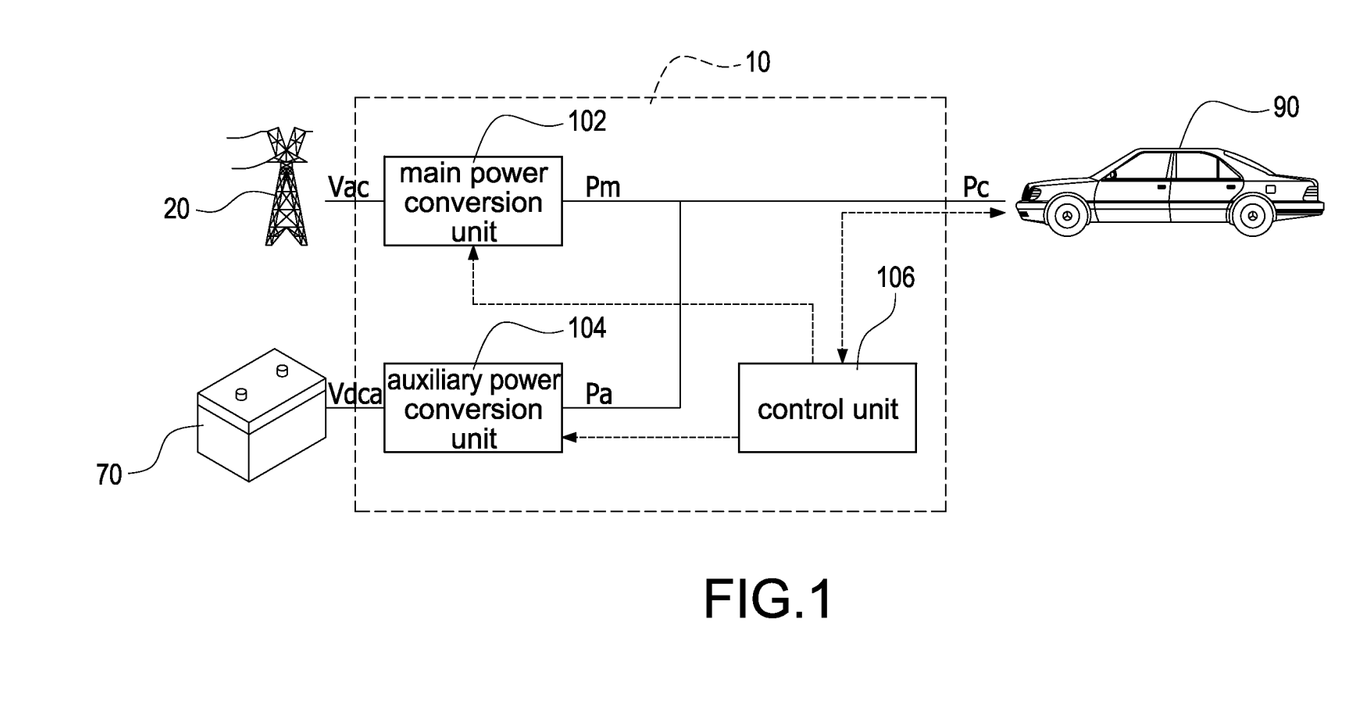
FIG. 1 is a schematic circuit block diagram of a charging apparatus with dynamical charging power according to a first embodiment of the present disclosure.

Reference is made to FIG. 1 which is a schematic circuit block diagram of a charging apparatus with dynamical charging power according to a first embodiment of the present disclosure. The charging apparatus 10 with dynamical charging power is provided to charge an electric vehicle 90. The charging apparatus 10 with dynamical charging power includes a main power conversion unit 102, an auxiliary power conversion unit 104, and a control unit 106. The main power conversion unit 102 receives an AC power Vac outputted from an AC electric grid 20, and converts the AC power Vac into a main output power Pm. The auxiliary power conversion unit 104 receives an auxiliary DC power Vdca and converts the auxiliary DC power Vdca into an auxiliary output power Pa. Especially, the auxiliary DC power Vdca can be outputted from a secondary battery 70 (also referred to as a rechargeable battery. The control unit 106 controls maximum output power of the main output power Pm to be an upper-limit output power value Pu. The control unit 106 dynamically controls the auxiliary output power Pa according to a power difference value between the charging power value Pc and the upper-limit output power value Pu, namely Pc−Pu when a charging power value Pc of charging the electric vehicle is greater than the upper-limit output power value Pu.

Figure 2:
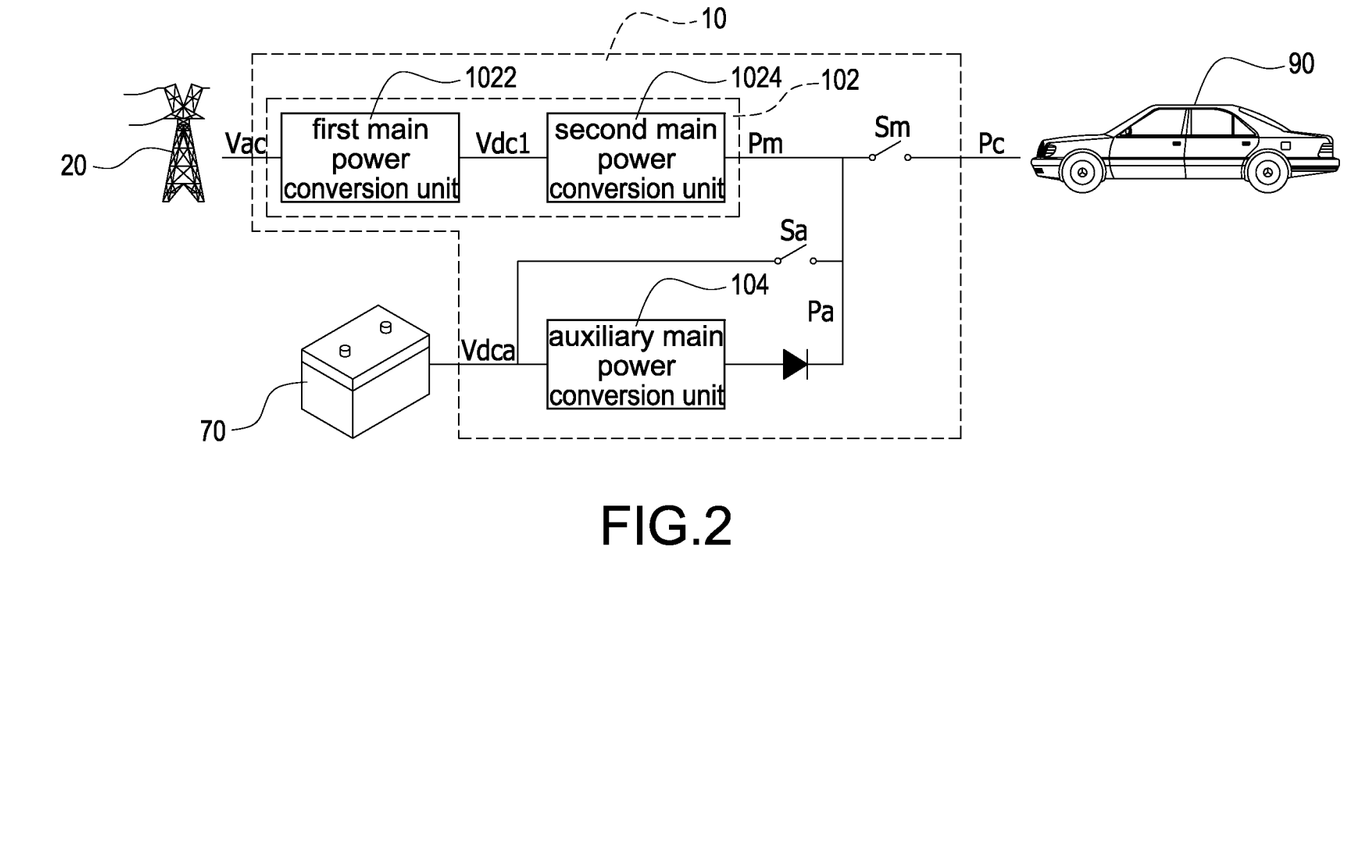
FIG. 2 is a schematic circuit block diagram of the charging apparatus with dynamical charging power according to a second embodiment of the present disclosure.

Reference is made to FIG. 2 which is a schematic circuit block diagram of the charging apparatus with dynamical charging power according to a second embodiment of the present disclosure. The main power conversion unit 102 includes a first main power conversion unit 1022 and a second main power conversion unit 1024. The first main power conversion unit 1022 receives the AC power Vac and converts the AC power Vac into a first DC power Vdc1. The second main power conversion unit 1024 receives the first DC power Vdc1 and converts the first DC power Vdc1 into the main output power Pm. In particular, the first main power conversion unit 1022 is an AC-to-DC converter to convert the AC power Vac into the first DC power Vdc1. The second main power conversion unit 1024 is a DC-to-DC converter to convert a voltage level of the first DC power Vdc1 into the required voltage level for charging the electric vehicle 90. The auxiliary power conversion unit 104 is a DC-to-DC converter to convert a voltage level of the auxiliary DC power Vdca into the required voltage level for charging the electric vehicle 90. In addition, the charging apparatus 10 with dynamical charging power further includes a main switch unit Sm and an auxiliary switch unit Sa. The main switch unit Sm is connected to an output side of the second main power conversion unit 1024. The auxiliary switch unit Sa is connected between an output side of the secondary battery 70 and the output side of the second main power conversion unit 1024.

Figure 3:
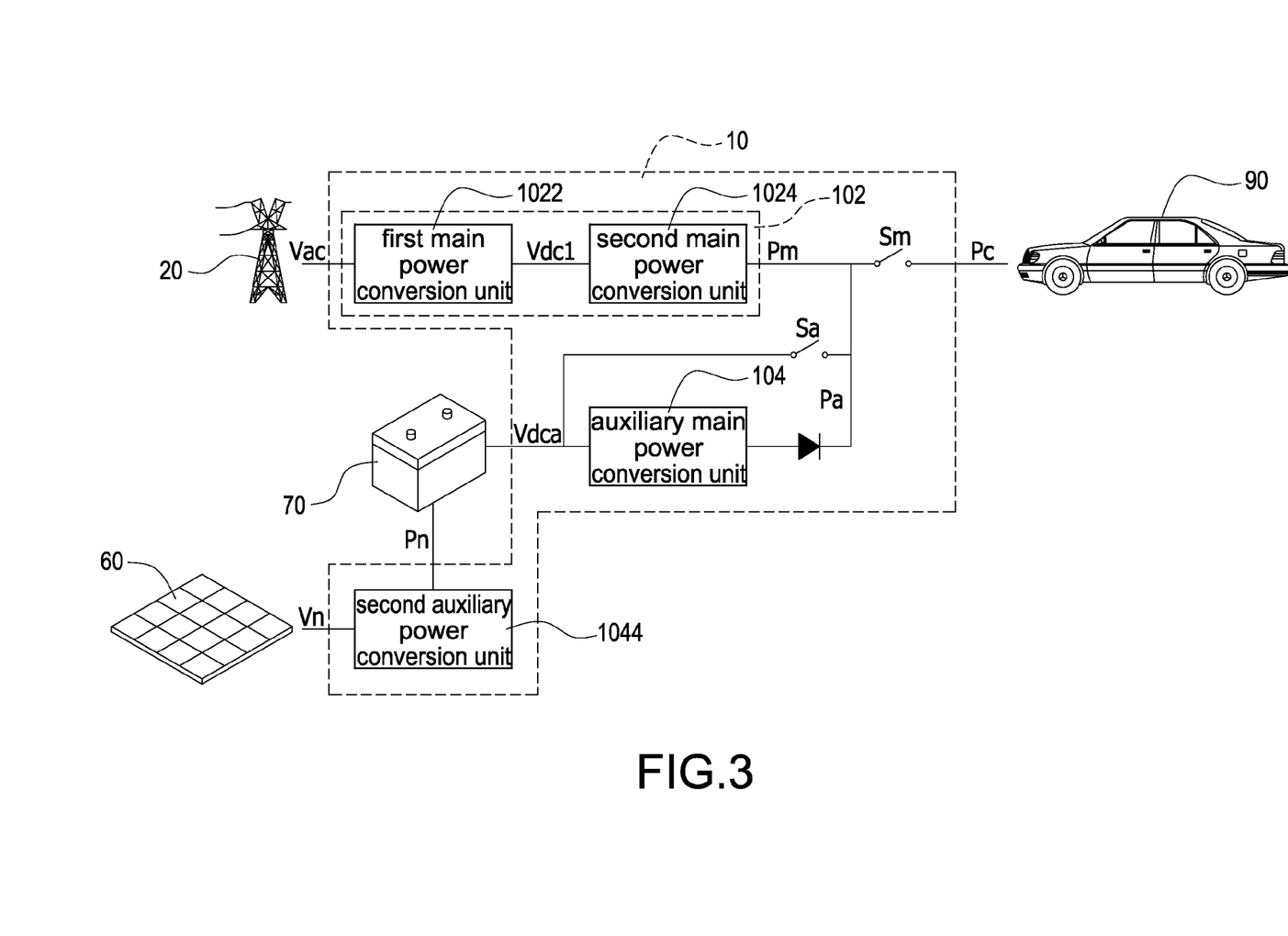
FIG. 3 is a schematic circuit block diagram of the charging apparatus with dynamical charging power according to a third embodiment of the present disclosure.

Reference is made to FIG. 3 which is a schematic circuit block diagram of charging an electric vehicle by the charging apparatus according to the present disclosure. The charging apparatus 10 with dynamical charging power further includes a second auxiliary power conversion unit 1044. The second auxiliary power conversion unit 1044 receives a renewable DC power Vn outputted from a renewable energy generation apparatus 60, and converts the renewable DC power Vn into a renewable output power Pn. In particular, the second auxiliary power conversion unit 1044 is a DC-to-DC converter to convert a voltage level of the renewable DC power Vn into the required voltage level for charging the secondary battery 70. Further, the renewable energy generation apparatus 60 is a solar energy generation apparatus or a wind energy generation apparatus. However, the embodiments are only exemplified but are not intended to limit the scope of the disclosure. The preferred Embodiment in the present disclosure is that the charging apparatus 10 with dynamical charging power (i.e. a charging station) mainly includes the first main power conversion unit 1022, the second main power conversion unit 1024, the auxiliary power conversion unit 104, the second auxiliary power conversion unit 1044, the control unit 106, the main switch unit Sm, and the auxiliary switch unit Sa. The detailed operation of the charging apparatus 10 with dynamical charging power will be described hereinafter as follows.

Figure 4:
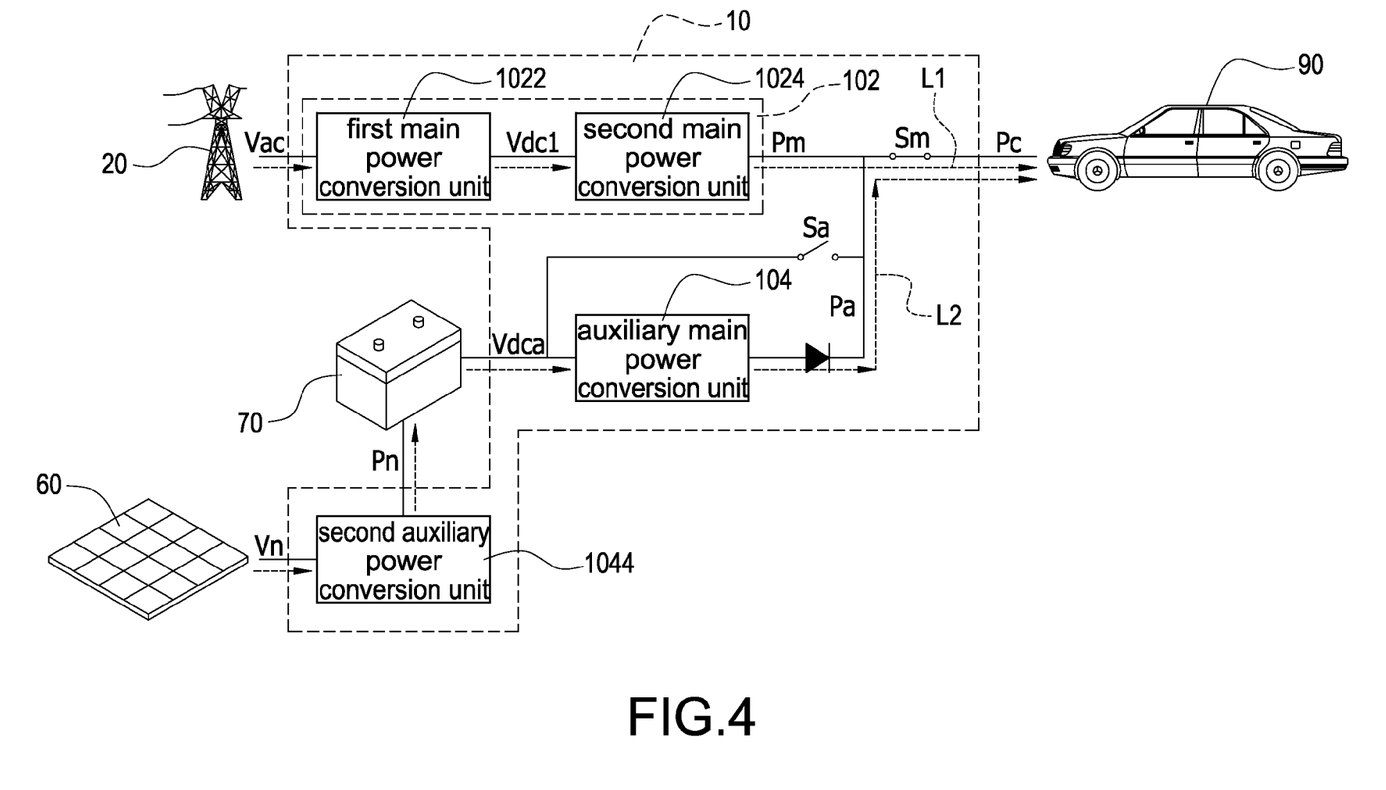
FIG. 4 is a schematic circuit block diagram of charging an electric vehicle by the charging apparatus according to the present disclosure.

Reference is made to FIG. 4 which is a schematic circuit block diagram of charging an electric vehicle by the charging apparatus according to the present disclosure. When the electric vehicle is connected to the charging station, the charging apparatus 10 with dynamical charging power is communicated to the electric vehicle 90 through the control unit 106 for data communication and exchange, such as charging demand information of the electric vehicle, power supplying information of the charging station, and so on. For convenience, reasonable assumed data are exemplified to further demonstrate the present disclosure. Especially, in order to reduce that the charging apparatus 10 is excessively dependent on the AC electric grid 20, the current regulations specify the maximum output power of the AC electric grid 20 for the charging apparatus 10. Accordingly, the control unit 106 controls maximum output power of the main output power Pm to be an upper-limit output power value Pu. It is assumed that the upper-limit output power value Pu is 50 kW. When a charging power value Pc required for charging the electric vehicle 90 is greater than the upper-limit output power value Pu, the control unit 106 dynamically controls the auxiliary output power Pa outputted from the auxiliary power conversion unit 104 according to a power difference value between the charging power value Pc and the upper-limit output power value Pu. It is assumed that the required charging power value Pc is 70 kW which is greater than the charging power value Pc (50 kW). When the control unit 106 detects that the required charging power value Pc is 70 kW, the control unit 106 controls the auxiliary power conversion unit 104 to output the auxiliary output power Pa being 20 kW and combines the charging power value Pc (50 kW) to charge the electric vehicle 90. In other words, the insufficient charging power, namely the power difference between the charging power value Pc and the upper-limit output power value Pu is provided by the auxiliary output power Pa outputted from the auxiliary power conversion unit 104. More specifically, when the control unit 106 turns on the main switch unit Sm and turns off the auxiliary switch unit Sa, the main output power Pm, which is limited to be the upper-limit output power value Pu, outputted from the second main power conversion unit 1024 is combined with the auxiliary output power Pa outputted from the auxiliary power conversion unit 104 to charge the electric vehicle 90, and the charging paths L1, L2 are shown in FIG. 4. In particular, the main output power Pm is generated by the AC electric grid 20 and the auxiliary output power Pa is generated by secondary battery 70.

In addition, if the renewable energy generation apparatus 60 is a solar energy generation apparatus and it cannot provide output power because of charging the electric vehicle 90 at night time or at bad weather conditions, the stored power in the secondary battery 70 is combined with the power outputted from the AC electric grid 20 to charge the electric vehicle 90. In addition, if the secondary battery 70 cannot provide output power or provides insufficient output power, the control unit 106 dynamically controls the AC electric grid 20 to output less power to charge the electric vehicle 90 by communication of charging information and power supplying information.

Figure 5:
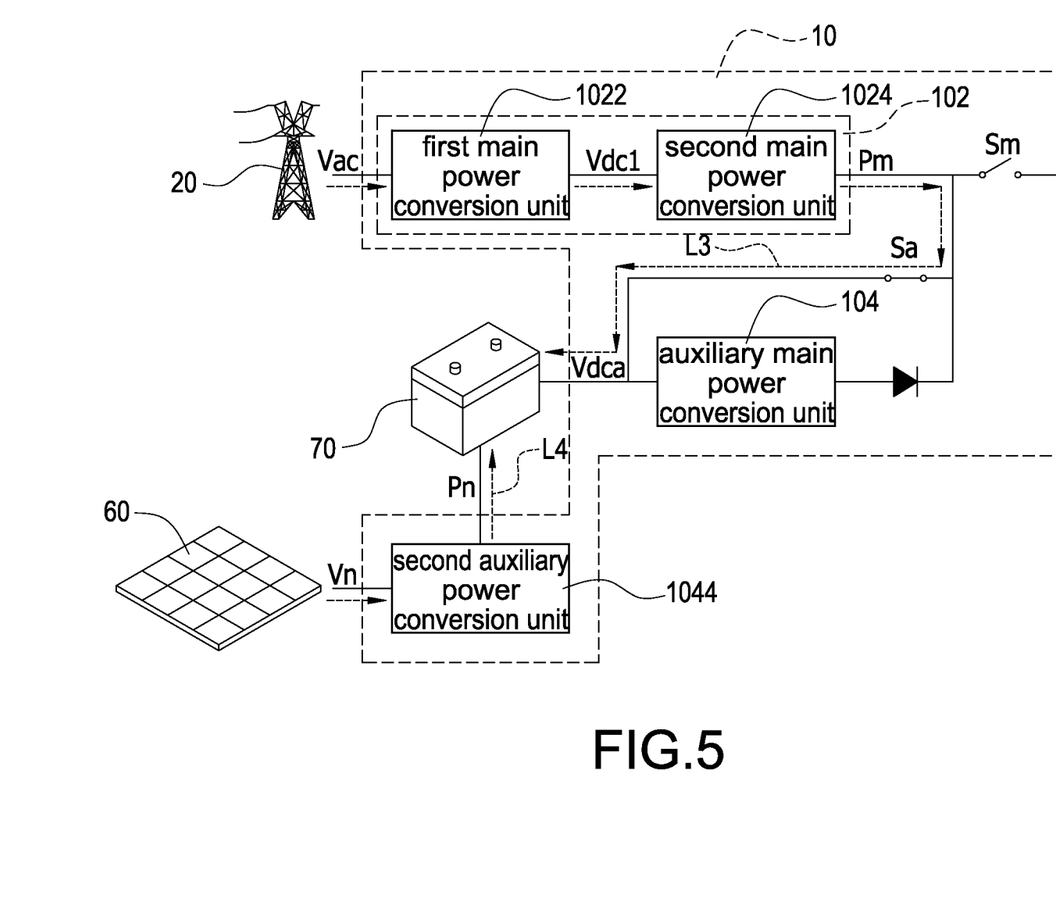
FIG. 5 is a schematic circuit block diagram of charging a secondary battery by the charging apparatus according to the present disclosure.

Reference is made to FIG. 5 which is a schematic circuit block diagram of charging a secondary battery by the charging apparatus according to the present disclosure. When the control unit 106 detects that no any electric vehicle is charged at the charging apparatus 10, the control unit 106 turns off the main switch unit Sm and turns on the auxiliary switch unit Sa so that the main output power Pm outputted from the second main power conversion unit 1024 is combined with the renewable output power Pn outputted from the second auxiliary power conversion unit 1044 to charge the secondary battery 70, and the charging paths L3, L4 are shown in FIG. 5. In particular, the main output power Pm generated by the AC electric grid 20 and the renewable output power Pn generated by the renewable energy generation apparatus 60. In addition, the main output power Pm generated by the AC electric grid 20 individually charges the secondary battery 70 if the renewable energy generation apparatus 60 cannot provide output power.

Figure 6:
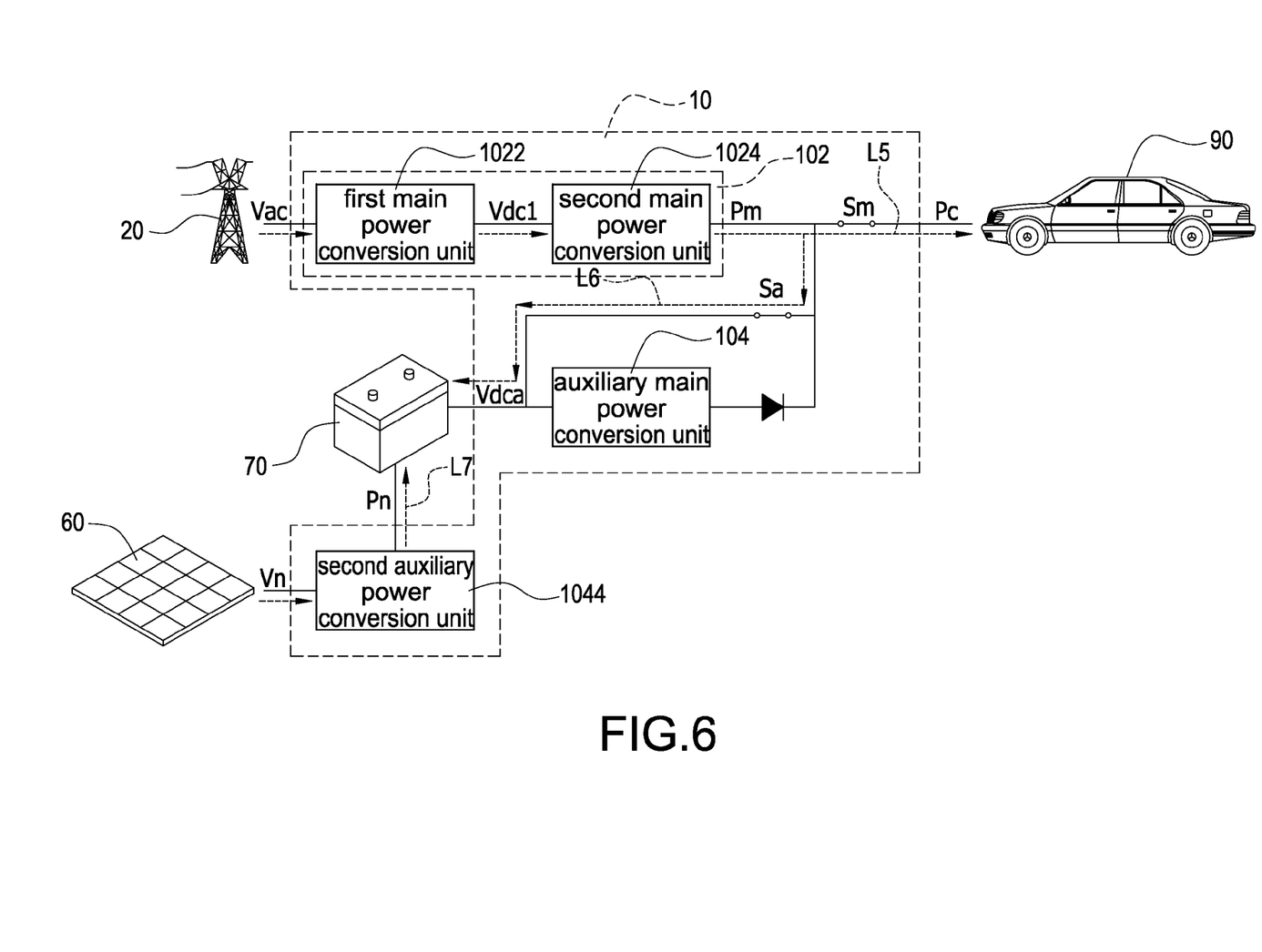
FIG. 6 is a schematic circuit block diagram of charging of charging the electric vehicle and the secondary battery by the charging apparatus according to the present disclosure.

Reference is made to FIG. 6 which is a schematic circuit block diagram of charging of charging the electric vehicle and the secondary battery by the charging apparatus according to the present disclosure. As mentioned above, the control unit 106 controls maximum output power of the main output power Pm outputted from the main power conversion unit 102 to be the upper-limit output power value Pu. It is assumed that the upper-limit output power value Pu is 50 kW. When a charging power value Pc required for charging the electric vehicle 90 is less than or equal to the upper-limit output power value Pu, the control unit 106 dynamically controls the upper-limit output power value Pu outputted from the main power conversion unit 102 to charge the electric vehicle 90. It is assumed that the required charging power value Pc is 30 kW which is less than or equal to the charging power value Pc (50 kW). When the control unit 106 detects that the required charging power value Pc is 30 kW, the control unit 106 controls the main power conversion unit 102 to output the upper-limit output power value Pu (50 kW) to charge the electric vehicle 90, and the charging path L5 is shown in FIG. 6. Because the charging power value Pc required for charging the electric vehicle 90 is less than or equal to the upper-limit output power value Pu, however, the redundant power outputted from the main power conversion unit 102 is combined with the renewable output power Pn outputted from the second auxiliary power conversion unit 1044 to charge the secondary battery 70, and the charging paths L6, L7 are shown in FIG. 6. In particular, the main output power Pm generated by the AC electric grid 20 and the renewable output power Pn generated by the renewable energy generation apparatus 60.

In addition, the upper-limit output power value Pu outputted from the main power conversion unit 102 is sufficient to individually charge the electric vehicle 90, and the redundant power outputted from the main power conversion unit 102 is also simultaneously provided to charge the secondary battery 70.

Figure 7:
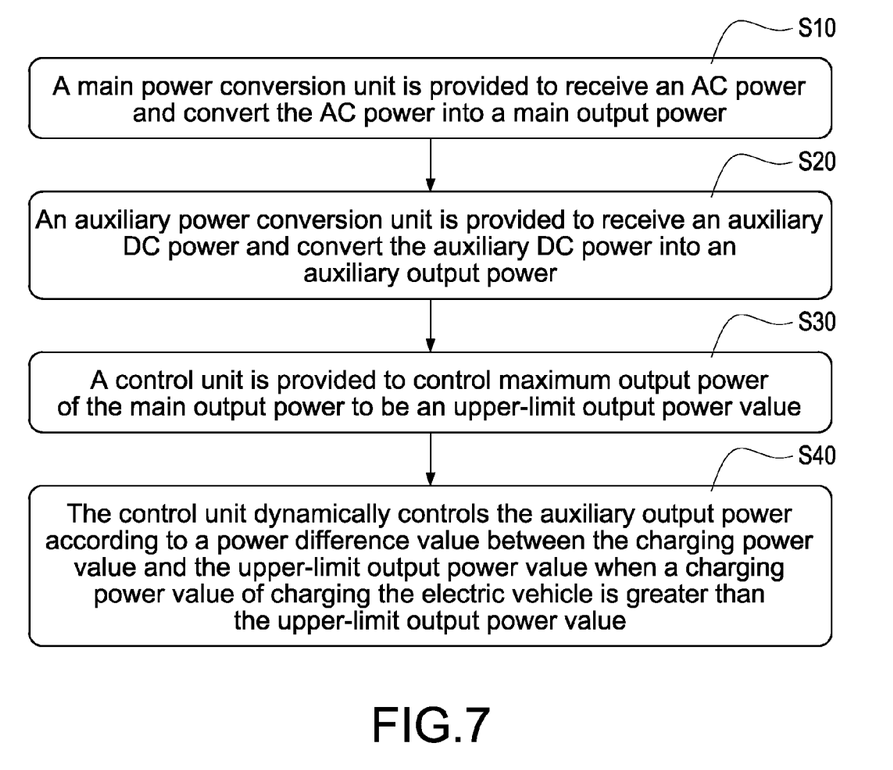
FIG. 7 is a flowchart of a method of operating a charging apparatus with dynamical charging power according to the present disclosure.

Reference is made to FIG. 7 which is a flowchart of a method of operating a charging apparatus with dynamical charging power according to the present disclosure. The method is provided to charge an electric vehicle, and the method includes following steps. First, a main power conversion unit is provided to receive an AC power and convert the AC power into a main output power (S10). In particular, the main power conversion unit includes a first main power conversion unit and a second main power conversion unit. The first main power conversion unit receives the AC power and converts the AC power into a first DC power. The second main power conversion unit receives the first DC power and converts the first DC power into the main output power.

Afterward, an auxiliary power conversion unit is provided to receive an auxiliary DC power and convert the auxiliary DC power into an auxiliary output power (S20). In particular, the auxiliary output power is generated by a secondary battery. In addition, the charging apparatus with dynamical charging power further includes a second auxiliary power conversion unit. The second auxiliary power conversion unit receives a renewable DC power outputted from a renewable energy generation apparatus, and converts the renewable DC power into a renewable output power. In particular, the first main power conversion unit is an AC-to-DC converter; the second main power conversion unit is a DC-to-DC converter; the auxiliary power conversion unit is a DC-to-DC converter; the second auxiliary power conversion unit is a DC-to-DC converter. In particular, the renewable energy generation apparatus is a solar energy generation apparatus or a wind energy generation apparatus. In addition, the n, the charging apparatus with dynamical charging power further includes a main switch unit and an auxiliary switch unit. The main switch unit is connected to an output side of the second main power conversion unit. The auxiliary switch unit is connected between an output side of the secondary battery and the output side of the second main power conversion unit.

Afterward, a control unit is provided to control maximum output power of the main output power to be an upper-limit output power value (S30). Finally, the control unit dynamically controls the auxiliary output power according to a power difference value between the charging power value and the upper-limit output power value when a charging power value of charging the electric vehicle is greater than the upper-limit output power value (S40).

More specifically, the charging apparatus with dynamical charging power provides at least three operation conditions:

1. The main output power outputted from the second main power conversion unit is combined with the auxiliary output power outputted from the auxiliary power conversion unit to charge the electric vehicle when the control unit when the control unit turns on the main switch unit and turns off the auxiliary switch unit. In particular, the main output power is generated by the AC electric grid and the auxiliary output power is generated by secondary battery.

2. The main output power outputted from the second main power conversion unit is combined with the renewable output power outputted from the second auxiliary power conversion unit to charge the secondary battery when the control unit turns off the main switch unit and turns on the auxiliary switch unit. In particular, the main output power is generated by the AC electric grid and the renewable output power is generated by the renewable energy generation apparatus.

3. One part of the main output power outputted from the second main power conversion unit is provided to charge the electric vehicle, and the other part of the main output power is combined with the renewable output power outputted from the second auxiliary power conversion unit to charge the secondary battery when the control unit is configured to turn on the main switch unit and turn on the auxiliary switch unit. In particular, the main output power is generated by the AC electric grid and the renewable output power is generated by the renewable energy generation apparatus.

Especially, the charging apparatus with dynamical charging power means that the current regulations specify the maximum output power of the AC electric grid 20 for the charging apparatus 10 so as to reduce that the charging apparatus 10 is excessively dependent on the AC electric grid 20, that is, the control unit 106 controls maximum output power of the main output power Pm outputted from the main power conversion unit 102 to be an upper-limit output power value Pu. Because the charging power is not fixed during the charging operation for the electric vehicle 90, however, the control unit 106 dynamically controls the auxiliary output power Pa outputted from the auxiliary power conversion unit 104 according to variation of the charging power for the electric vehicle 90 so as to ensure that the charging apparatus 10 stably and accurately charges the electric vehicle 90 during the charging operation.

In conclusion, the present disclosure has following advantages:

1. In order to meet the current regulations, that is, the maximum output power for supplying to the charging apparatus (charging station) 10 from the AC electric grid 20 is limited. Also, the AC electric grid 20 is combined with the renewable energy generation apparatus 60, such as the solar energy generation apparatus or the wind energy generation apparatus to charge the electric vehicle 90. Accordingly, it is to reduce that the charging apparatus 10 is excessively dependent on the AC electric grid 20 and increase demands of environmental protection and energy saving;

2. The insufficient charging power for the electric vehicle 90 is provided by combining the auxiliary output power Pa outputted from the auxiliary power conversion unit 104 with the upper-limit output power value Pu outputted from the main power conversion unit 102 to charge the electric vehicle 90 by the control unit 106; and 3. Because the charging power is not fixed during the charging operation for the electric vehicle 90, the control unit 106 dynamically controls the auxiliary output power Pa outputted from the auxiliary power conversion unit 104 according to variation of the charging power so as to ensure that the charging apparatus 10 stably and accurately charges the electric vehicle 90 during the charging operation.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A charging apparatus with dynamical charging power configured to charge an electric vehicle, the charging apparatus comprising:
    a main power conversion unit configured to receive an AC power and convert the AC power into a main output power;
    a main switch unit connected to an output side of the main power conversion unit;
    an auxiliary power conversion unit configured to receive an auxiliary DC power and convert the auxiliary DC power into an auxiliary output power;
    an auxiliary switch unit connected between an input side of the auxiliary power conversion unit and the output side of the main power conversion unit; and
    a control unit configured to control maximum output power of the main output power to be an upper-limit output power value,
    wherein
        the control unit is configured to dynamically control the auxiliary output power according to a power difference value between a charging power value and the upper-limit output power value when the charging power value of charging the electric vehicle is greater than the upper-limit output power value, and the main output power is DC power and the auxiliary output power is DC power.

2. The charging apparatus with dynamical charging power in claim 1, wherein the main output power outputted from the main power conversion unit is combined with the auxiliary output power outputted from the auxiliary power conversion unit to charge the electric vehicle when the control unit is configured to turn on the main switch unit and turn off the auxiliary switch unit; wherein the main output power is generated by an AC electric grid and the auxiliary DC power is generated by a secondary battery.

3. The charging apparatus with dynamical charging power in claim 2, further comprising:
    a second auxiliary power conversion unit configured to receive a renewable DC power outputted from a renewable energy generation apparatus, and convert the renewable DC power into a renewable output power.

4. The charging apparatus with dynamical charging power in claim 3, wherein the main output power outputted from the main power conversion unit is combined with the renewable output power outputted from the second auxiliary power conversion unit to charge the secondary battery when the control unit is configured to turn off the main switch unit and turn on the auxiliary switch unit; wherein the main output power is generated by the AC electric grid and the renewable output power is generated by the renewable energy generation apparatus.

5. The charging apparatus with dynamical charging power in claim 3, wherein one part of the main output power outputted from the main power conversion unit is configured to charge the electric vehicle, and the other part of the main output power is combined with the renewable output power outputted from the second auxiliary power conversion unit to charge the secondary battery when the control unit is configured to turn on the main switch unit and turn on the auxiliary switch unit; wherein the main output power is generated by the AC electric grid and the renewable output power is generated by the renewable energy generation apparatus.

6. The charging apparatus with dynamical charging power in claim 3, wherein the renewable energy generation apparatus is a solar energy generation apparatus or a wind energy generation apparatus.

7. The charging apparatus with dynamical charging power in claim 1, wherein the main power conversion unit has a first main power conversion unit and a second main power conversion unit; the first main power conversion unit is configured to receive the AC power and convert the AC power into a first DC power; the second main power conversion unit is configured to receive the first DC power and convert the first DC power into the main output power.

8. The charging apparatus with dynamical charging power in claim 7, wherein the first main power conversion unit is an AC-to-DC converter; the second main power conversion unit is a DC-to-DC converter; the auxiliary power conversion unit is a DC-to-DC converter; the second auxiliary power conversion unit is a DC-to-DC converter.

9. A method of operating a charging apparatus with dynamical charging power configured to charge an electric vehicle, the method comprising:
    providing a main power conversion unit configured to receive an AC power and convert the AC power into a DC main output power;
    providing a main switch unit connected to an output side of the main power conversion unit;
    providing an auxiliary power conversion unit configured to receive an auxiliary DC power and convert the auxiliary DC power into an auxiliary DC output power;
    providing an auxiliary switch unit connected between an input side of the auxiliary power conversion unit and the output side of the main power conversion unit;
    providing a control unit configured to control maximum output power of the main output power to be an upper-limit output power value; and
    dynamically controlling the auxiliary DC output power according to a power difference value between a charging power value and the upper-limit output power value when the charging power value of charging the electric vehicle is greater than the upper-limit output power value, wherein the main output power and the auxiliary output power is DC power.

10. The method of operating the charging apparatus with dynamical charging power in claim 9, wherein the main output power outputted from the main power conversion unit is combined with the auxiliary output power outputted from the auxiliary power conversion unit to charge the electric vehicle when the control unit is configured to turn on the main switch unit and turn off the auxiliary switch unit; wherein the main output power is generated by an AC electric grid and the auxiliary DC power is generated by a secondary battery.

11. The method of operating the charging apparatus with dynamical charging power in claim 10, wherein the charging apparatus further comprises:
a second auxiliary power conversion unit is configured to receive a renewable DC power outputted from a renewable energy generation apparatus, and convert the renewable DC power into a renewable output power.

12. The method of operating the charging apparatus with dynamical charging power in claim 11, wherein the main output power outputted from the main power conversion unit is combined with the renewable output power outputted from the second auxiliary power conversion unit to charge the secondary battery when the control unit is configured to turn off the main switch unit and turn on the auxiliary switch unit; wherein the main output power is generated by the AC electric grid and the renewable output power is generated by the renewable energy generation apparatus.

13. The method of operating the charging apparatus with dynamical charging power in claim 11, wherein one part of the main output power outputted from the main power conversion unit is configured to charge the electric vehicle, and the other part of the main output power is combined with the renewable output power outputted from the second auxiliary power conversion unit to charge the secondary battery when the control unit is configured to turn on the main switch unit and turn on the auxiliary switch unit; wherein the main output power is generated by the AC electric grid and the renewable output power is generated by the renewable energy generation apparatus.

14. The method of operating the charging apparatus with dynamical charging power in claim 11, wherein the renewable energy generation apparatus is a solar energy generation apparatus or a wind energy generation apparatus.

15. The method of operating the charging apparatus with dynamical charging power in claim 9, wherein the main power conversion unit has a first main power conversion unit and a second main power conversion unit; the first main power conversion unit is configured to receive the AC power and convert the AC power into a first DC power; the second main power conversion unit is configured to receive the first DC power and convert the first DC power into the main output power.

16. The method of operating the charging apparatus with dynamical charging power in claim 15, wherein the first main power conversion unit is an AC-to-DC converter; the second main power conversion unit is a DC-to-DC converter; the auxiliary power conversion unit is a DC-to-DC converter; the second auxiliary power conversion unit is a DC-to-DC converter.

* * * * *